F. FAIRBANKS.
Platform-Scales.
No. 227,969. Patented May 25, 1880.
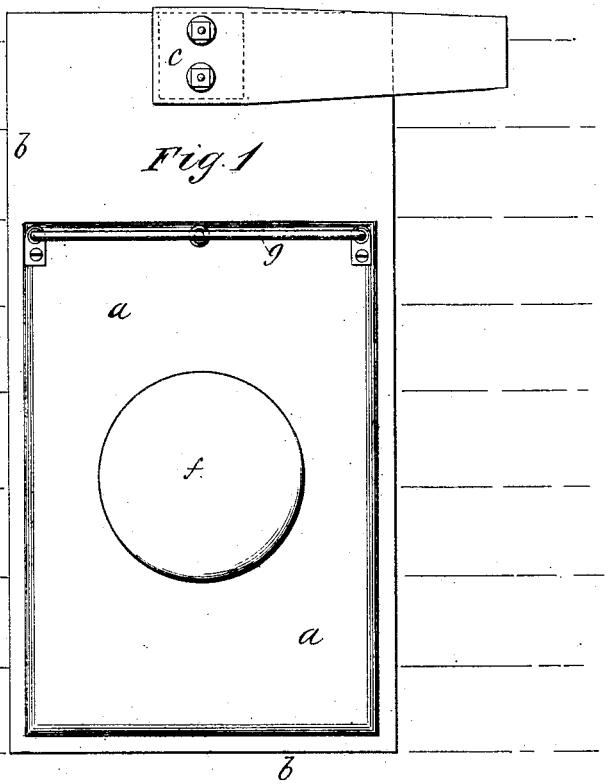
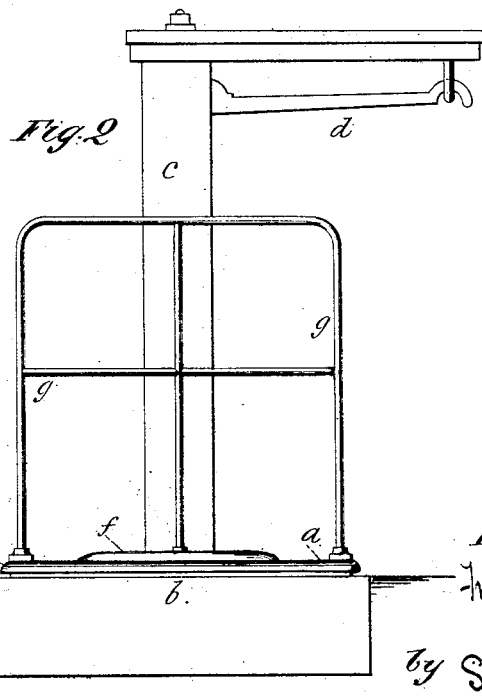

United States Patent Office.

FRANKLIN FAIRBANKS, OF ST. JOHNSBURY, VERMONT, ASSIGNOR TO
E. & T. FAIRBANKS & CO., OF SAME PLACE.

PLATFORM-SCALE.

SPECIFICATION forming part of Letters Patent No. 227,969, dated May 25, 1880.

Application filed January 19, 1880.

*To all whom it may concern:*

Be it known that I, FRANKLIN FAIRBANKS, of St. Johnsbury, Caledonia county, Vermont, assignor to E. & T. FAIRBANKS & CO., of same place, have invented certain new and useful Improvements in Platform-Scales, of which the following is a specification.

My invention relates more especially to "dormant" scales, or those which are fixed within the floor, with the platform on a level therewith; and the object of my invention is to provide a platform-scale with a platform so formed as to be adapted for the weighing of all ordinary articles, while being especially adapted to steady and support barrels while being packed and weighed thereon; and to this end the main feature of my invention may be stated to consist in a flat extended platform formed with a circular protuberance, or its equivalent, upon the flat extended face thereof, adapted to enter and steady the head of a barrel while being filled and weighed upon the scale, whereby a number of adaptations are united in the one scales, as hereinafter fully set forth.

Figure 1 of the adjoined drawings gives a plan view of my improved scale, and Fig. 2 an end elevation thereof.

In flour-mills, grain-warehouses, and other works where barrels and sacks are filled with a required weight of dry material, a need has been felt for a scales specially adapted for weighing such barrels or sacks, which will hold the same firmly while being filled and packed, and at the same time be adapted for general weighing, so as to save the space and expense of several scales and the inconvenience of managing a number of them.

The scale heretofore used for barreling flour, as is well known, is constructed with a small circular platform, which rises above the fixed casement of the scales, and is adapted to enter the head of the barrel and steady and support the barrel while being packed under a press, and by a hand or foot lever this platform is dropped out of action to relieve the scales of strain during packing, or is raised into action to test the weight, as is well known to those familiar with scales. The form of the platform in this case, as will be obvious, unfits the scales for general weighing and confines it entirely to barreling.

On the other hand, the scales heretofore used for bagging is constructed with a flat platform of usual form, having an upright rail at one end to support the sack or bag while being filled and weighed, and this form of scale, while being thus adapted for bagging or for general weighing, is not adapted for barreling.

Now, my invention is distinguished by constructing a scale with a platform so formed as to embody all these capabilities, and thus secure the important advantage of economy and convenience.

In the drawings, $a$ indicates the platform of the scales, and $b$ the casement or frame thereof, which may be fixed in the flooring level with or below the floor in the case of a dormant scale, or may be mounted on wheels in case of a portable scale, the dormant construction being, however, the one specially contemplated in this invention.

It is also designed to have the platform $a$ set into the casement of the scale or into the flooring level with the surface of the floor.

$c$ indicates the pillar, and $d$ the beam, of the scale. All the internal and external parts of the scale, except the external face of the platform, in which my invention is embodied, may be constructed in the usual manner, and the scales may also be provided with the usual hand or foot lever, (not shown,) by which the platform and levers may be dropped out of action during the strain of filling and packing, and again raised into action when the weight is to be tested, as will be readily understood.

According to my invention, therefore, I construct the scale, as illustrated, with a flat extended platform of about the usual oblong shape and of about the usual dimensions, or, rather, a little larger than usual, and I provide the flat face of this platform with a raised circular boss or bulge, $f$, rigidly formed on or fixed to the platform, and situated within the limits of the platform, or about centrally thereof, as shown, which boss is adapted to enter and support the head of a barrel in the usual manner when placed on the platform, as will be readily appreciated. Forming the platform in this way thus adapts the scale for ordinary weighing as well as for barreling, as its flat extent is capable of receiving all ordinary articles, while its central bulge or boss fits it for holding barrels under a press while being filled and packed before weighing, and thus constitutes a material improvement over previous scales. I also prefer to provide this platform with an upright rail, $g$, rising at the back end thereof, similar to what is used on ordinary bagging-scales, by which bags or sacks may be supported in the usual manner while being filled and weighed, and between this rail and the boss $f$ there is a sufficient extent of the flat surface of the platform to admit and support the bottom of the bag, as shown in Fig. 1. A depression or cavity may, however, be formed in this part of the platform, to conform to the bottom of the filled bag and better support the same, if desired.

A simple modification for the externally-raised boss $f$ will be a circular depression in the platform, to admit and steady the barrel-head, or, what is preferable, an annular groove may be formed in the center of the platform to admit the chine of the barrel, while the circular boss within this groove, which may be level with the rest of the platform, will rise within the barrel-head and act in the same manner as the external boss. A series of small projections rising from the platform on a level with each other, and circularly arranged, may also be used in lieu of the boss $f$; but the construction illustrated, of which these modifications are obvious substitutes, is found the most preferable.

It will therefore be observed that as this construction of the platform fits it for all ordinary weighing, as well as for barreling or bagging, the capacities of several scales are thus combined in one. Hence one of the improved scales will serve the purpose of a flour-mill or similar works, where several distinct scales have been heretofore necessary, thus saving a large portion of space as well as a large item of expense. Moreover, the operation of this scale is found more convenient than the use of a number of scales, and the rolling of the barrels on and off the platform can be done more readily than is the case with the previous form of barreling-scale, owing to the small circular and isolated platform of the latter.

What I claim as my invention is—

1. A platform-scales constructed with a flat extended platform having a raised circular boss or its equivalent adapted to enter and steady the head of a barrel formed or fixed on or in its flat face, and situated within the limits of its flat extent, whereby the scales is adapted for barreling as well as for ordinary weighing, substantially as herein shown and described.

2. A platform-scales constructed with a flat extended platform having a raised circular boss or its equivalent formed on or in its flat face, and provided with an upright rail rising from the platform at one of the marginal edges thereof, whereby the scales is adapted for bagging, barreling, and ordinary weighing, as herein set forth.

3. A platform-scale constructed with a flat extended platform having an upright rail rising therefrom near the marginal edge thereof, and a raised circular boss or its equivalent formed on or in the flat face of the platform, and at a distance from the said rail, substantially as and for the purpose herein set forth.

FRANKLIN FAIRBANKS.

Witnesses:
WM. P. FAIRBANKS,
E. D. BLODGETT.